United States Patent [19]
Hasebe et al.

[11] 3,798,659
[45] Mar. 19, 1974

[54] CHART DRIVE MECHANISM FOR RECORDERS

[75] Inventors: Takefumi Hasebe; Arata Takizawa; Setsuc Sato, all of Tokyo, Japan

[73] Assignee: Yokohama Electric Works, Ltd., Tokyo, Japan

[22] Filed: Mar. 31, 1972

[21] Appl. No.: 240,000

[30] Foreign Application Priority Data
Apr. 5, 1971  Japan.............................. 46/20930

[52] U.S. Cl..................... 346/136, 74/325, 346/145
[51] Int. Cl. ........................................... G01d 15/24
[58] Field of Search............................ 346/136, 145

[56] References Cited
UNITED STATES PATENTS

| | | | |
|---|---|---|---|
| 2,446,400 | 8/1948 | Woolley.......................... | 346/136 X |
| 3,015,536 | 1/1962 | Nielsen et al....................... | 346/136 |
| 3,080,561 | 3/1963 | Bowditch et al................. | 346/145 X |
| 3,299,435 | 1/1967 | Dawe et al.......................... | 346/136 |
| 3,579,248 | 5/1971 | McGrath.......................... | 346/136 X |
| 3,611,431 | 10/1971 | Rosmanith.......................... | 346/145 |
| 3,314,076 | 4/1967 | DeMare............................ | 346/136 |

*Primary Examiner*—Joseph W. Hartary
*Attorney, Agent, or Firm*—Howard M. Bollinger

[57] ABSTRACT

A chart drive mechanism for recorders using folded recording paper. The blank recording paper is stored folded in a supply compartment above the sprocket drive and is fed down through the sprocket drive to a storage compartment. The gearing for the drive is of unitary construction, readily changeable as required.

6 Claims, 7 Drawing Figures

CHART DRIVE MECHANISM FOR RECORDERS

BACKGROUND OF THE INVENTION

1. Field of the Invention

The recent trend in the industrial process industry to the construction of larger and larger plants than heretofore has been accompanied by the introduction of instrument panels with considerably more gauges, meters, and other measuring instruments mounted thereon. This has necessarily led to miniaturization of the instruments. In spite of this general tendency toward smaller instruments for panels, however, some large measuring instruments, particularly large recorders, are still being sold and used extensively. This is in part because it is not possible simply to reduce the size of the recording paper without loss of readability i.e., the larger the size of the recording paper, with accordingly finer graduations, the more legible the record will be. Nevertheless, it is important to provide chart recorders which are compact, consistent of course with accommodating chart paper of appropriately large size.

2. Description of the Prior Art

Conventional recorders using strip charts are so designed that each has a sprocket or sprockets which are horizontally disposed in the upper front part of the body, the unused or blank portion of the paper being accommodated in a compartment underneath and behind the sprockets. The blank paper is pulled out by the sprockets upwardly from the inside of the instrument, and measured values are written by a recording pen or pens on the paper portion above the sprockets. The recorded portion hangs in front of the sprockets and is folded by its own weight. The position where the blank portion of paper is stored and the position where the recorded portion is stacked in folds are both underneath the sprockets, and the chart must follow a long and intricate path as it is forced up to the sprockets for recording and is brought down after the recording. For this reason, the chart drive mechanism comprising the compartments in which the blank paper portion is stored and the recorded portion is stacked in folds occupies a large space, thus making the instrument undesirably voluminous.

The chart drive mechanisms of the type described usually have a synchronous motor as their power source, and the output of the motor is transmitted to the sprockets by way of gearing with a transmission. The usual synchronous motor for driving the chart also ordinarily drives the depressor bar mechanism, and for that reason presents the advantage that a single synchronous motor serves a dual purpose. However, the fact that a single motor has to drive the depressor bar and, at the same time, feed the chart means imposes a heavy load on the motor and the necessity of a motor with a correspondingly increased output torque. This often necessitates a large motor. Further, because the output of the motor must be transmitted through two systems, the construction of the instrument is complicated. Moreover, the gears must be designed separately for the transmissions using different number of gears, and it has hampered the manufacture and incorporation of the gearings in unit assemblies.

SUMMARY OF THE INVENTION

One principal object of the present invention is to provide a chart drive mechanism which permits a reduction in size of present chart recorders.

To this end, the invention contemplates improvement of the system for feeding fold-type charts. In a preferred embodiment of the invention, the compatments to accommodate the unused portion and the recorded portion of the chart are located in a vertical relationship at the front of the instrument, and sprockets are disposed between those compartments in such relative positions that they are adjacent the inlet of the compartment for accommodating the recorded paper portion. The sprockets feed the chart in a straight line from the upper compartment to the lowe one. Thus, the chart drive mechanism occupies only a limited space, thereby enabling the instrument to be made compact in design. The compartment for the blank chart can be drawn out frontwardly of the recorder to facilitate the loading of the instrument with the chart.

The gearing equipped with shifting means for chart driving is of a unitary construction. The gears with different numbers of changes (e.g., two-speed or six-speed shifting) for driving the chart are accommodated in cases of the same shape, each associated with a synchronous motor as power source. Each of these units is fixed in a predetermined position on a side of the inner housing by only three screws. It is therefore readily possible to manufacture the unitary gearings beforehand, and to assemble chart drive mechanisms having different numbers of change gears as desired. If any gearing goes out of order, it can be easily replaced by an operable unit. In addition, the unitary construction facilitates mass production of such gearings.

The chart drive mechanism according to this invention has many other features, with respective advantages, which will become apparent from the following description.

DETAILED DESCRIPTION OF THE PREFERRED EMBODIMENT

Figure 1:
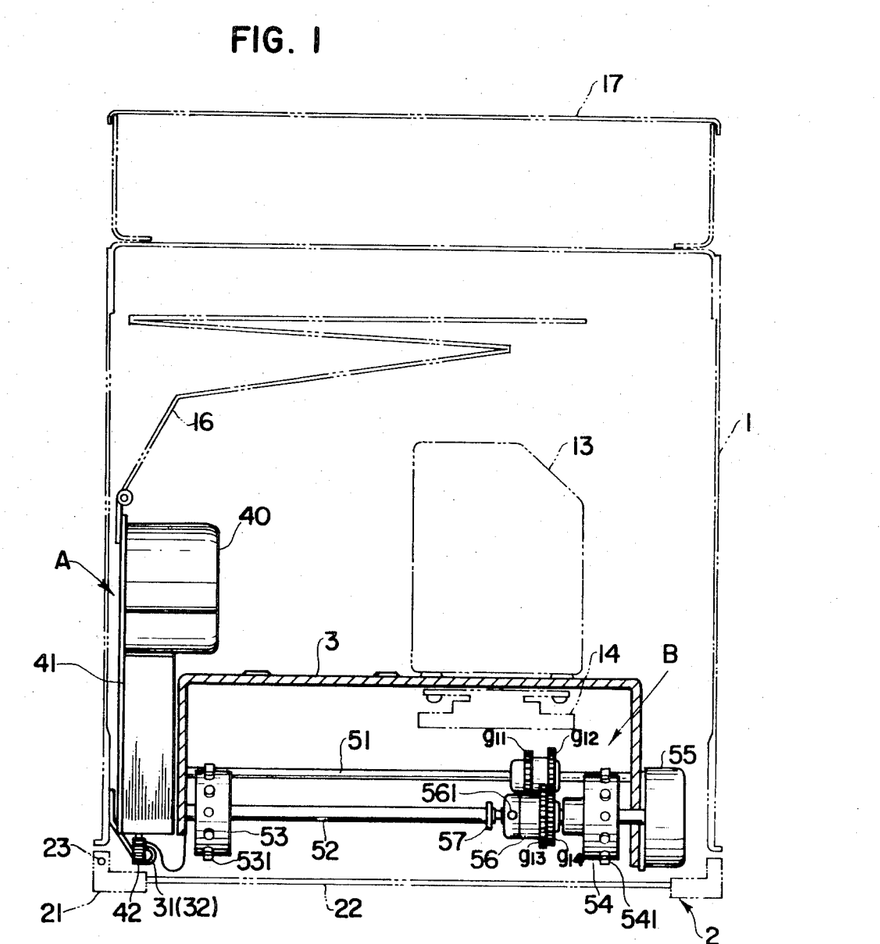
FIG. 1 is a transverse sectional view of an automatic null-balancing recorder incorporating a mechanism embodying the invention.
Figure 2:
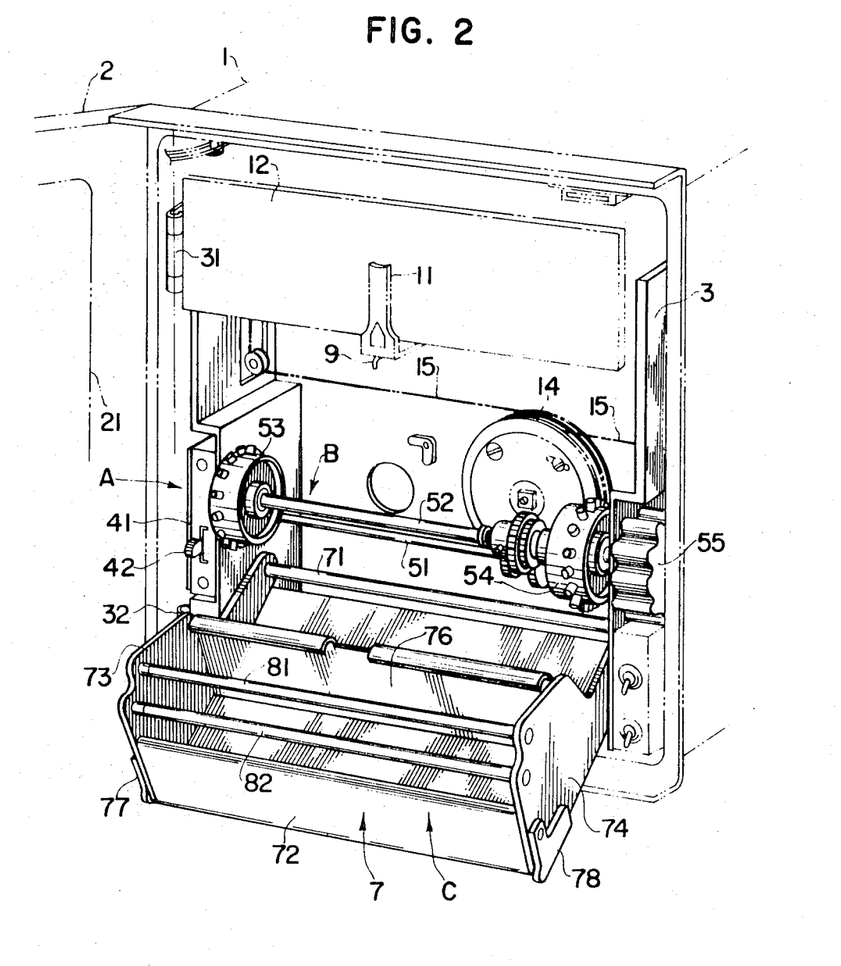
FIG. 2 is a perspective view of the recorder of FIG. 1, with the door opened and the chart holder drawn out.

Referring now to FIGS. 1 and 2, there is shown an automatic null-balancing recorder which incorporates a device according to the invention. Certain parts unnecessary for an understanding of the invention are not shown, for the sake of simplicity. The recorder includes a box-like case 1 having a door 2 provided with a transparent window 22 framed in a narrow door frame 21. The door is hingedly supported on the case with a rod 23 so that it can turn open toward the left as viewed in the figures. An inner housing 3, U-shaped in transverse section (FIG. 1), is adapted to turn around a vertical pair of hinges 31, 32 (FIG. 2), so that it can be pulled frontwardly out of the case 1. In this inner housing 3 is mounted the inner unit of the instrument.

Generally indicated at A is a gearing equipped with speed change gear and secured together to a side of the inner housing 3. The gearing is associated with a synchronous motor 40, which in turn has a built-in change gear using clutch means, so that by changing the rotational direction the output rpm of the motor can be changed to a ratio of 1 to 60.

Figure 3:
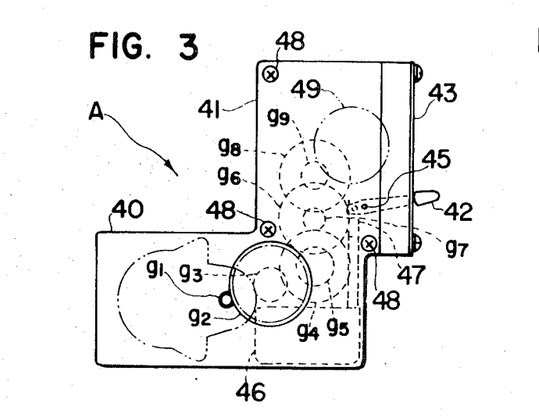
FIG. 3 is a view explanatory of a gearing used in the mechanism of FIG. 1.
Figure 4:
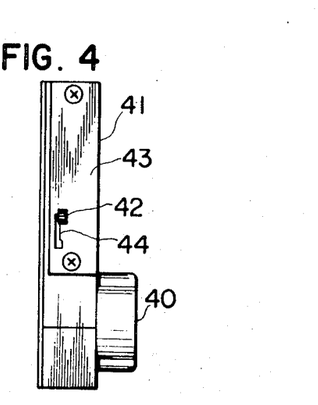
FIG. 4 is a right side view of the arrangement of FIG. 3.

In the embodiment shown, the gearing A is capable of feeding the recording paper in two speeds. Its structure is illustrated in FIGS. 3 and 4, and comprises a case 41, a change lever 42, and gears $g_1$ to $g_9$. Outside the case 41, the gear $g_2$ is in mesh with the output gear $g_1$ of the synchronous motor 40, while the rest of gears $g_3 - g_9$ are located within the case 41. The gear $g_9$ meshes with a gear on a transmission shaft to be described later, thereby to serve as an output gear for the gearing A.

A front plate 43 of the case 41 is formed with a generally [-shaped slot 44, through which the change lever 42 protrudes outwardly. The change lever 42 is pivotally supported by a pin 45, with its end inside the case 41 being connected to an actuating lever 47 which opens and closes a microswitch 46. The change lever 42, with its stem made of a leaf spring, is slightly biased rightward as viewed in FIG. 4. It turns about the pivot 45 to either of two positions. When it is in the upper recess of the [-shaped slot 44, the paper is fed at a high speed, and when it is shifted to the lower recess the actuating lever 47 is lifted to shift the set position of the microswitch 46. This shifting of the change lever 42 reverses the rotational direction of the synchronous motor 40, and thereby slows down the paper-feeding rate. In the case of the two-speed gearing A herein illustrated, the change lever 42 in the upper position permits feeding of the recording paper at a rate of 25mm/h and the lever in the lower position speeds up the feeding to 25 mm/min.

In addition to the two-speed type, the gearing A is available in other types, e.g., stepless (which causes the paper to be fed at a constant speed) and six-speed, all of identical outward appearance and dimensions. Each of such gearings can be secured to the inner housing by only three screws 48. Such gearings, each of which is constructed as a unit, are not only convenient for assembling and replacement but lend themselves to mass production.

The side plate of the case 41 facing the inner housing 3 is formed with an opening 49 as indicated by a circle of an alternate long and two short dashes line in FIG. 3, so that the circumference of a circular bearing 58 (FIG. 5) of a transmission shaft 51 (FIG. 1) closely fits in the opening 49. As a result, the position of the gearing A relative to the inner housing 3 to which the gearing is secured by three screws 48 as already described is naturally determined, and a proper intermeshing clearance is thereby maintained between the output gear $g_9$ of the gearing and the gear $g_{10}$ fixedly mounted on the transmission shaft 51.

Reverting to FIGS. 1 and 2, there is shown a sprocket drive mechanism B including the transmission shaft 51 and a sprocket shaft 52, both journaled in the inner housing 3. On the left end of the transmission shaft 51 are securely mounted gears $g_9$ and $g_{10}$, and on the right end, two gears $g_{11}$ and $g_{12}$. A pair of sprockets 53, 54 are fixed to the ends of the sprocket shaft 52 and are provided with a number of feed pins 531, 541, respectively, on their circumferences. There are also provided two gears $g_{13}, g_{14}$ corresponding to the gears $g_{11}$, $g_{12}$, and a turnable knob 55. The feed pins 531, 541 provided on the pair of sprockets 53, 54 engage with the perforations formed in continuous rows on the edges of the chart.

The gears $g_{13}$, $g_{14}$ are mounted on a sleeve 56, which is slidable over the sprocket shaft 52 when a set screw 561 thereon is loosened. At a point where the right end of the sleeve 56 contacts the right hand sprocket 54, the gears $g_{12}$ and $g_{14}$ mesh with each other, and at a point where the left end of the sleeve 56 contacts a ring 57, the gears $g_{11}$ and $g_{13}$ mesh with each other. The gear ratio of the gears $g_{11}$ and $g_{13}$ is chosen to be 1:1, and that of the gears $g_{12}$ and $g_{14}$ is chosen to be 5:6 or a ratio proportional to the following two frequencies. Where the frequency of the commercial electric source is 50 Hz, the sleeve 56 is set to its left-hand position, and where the frequency is 60 Hz, it is set to its right-hand position. Thus the position of the sleeve 56 is suitably chosen depending on the frequency of the power source available in the particular area where the recorder is operated, whereby the chart drive rate can always be the same and constant. This shifting is accomplished with ease from the front side of the instrument, and is a convenient feature for handling.

Inside the sleeve 56 is provided a clutch consisting of a helical spring. While the torque from the gearing A is being transmitted, the clutch is wound up to cause the sleeve 56 and the sprocket shaft 52 to rotate together. When the synchronous motor 40 has stopped and the turnable knob 55 has been turned by hand toward the operator, the clutch is loosened with the result that the sprockets 53, 54 can turn independently of each other. This provides a maximum convenience for the replacement of the chart while the instrument is in operation. The sprockets 53, 54 and the knob 55 are molded parts of a synthetic resin having metallic inserts. Circular bearing 58 bears one end of the transmission shaft 51.

Figure 5:
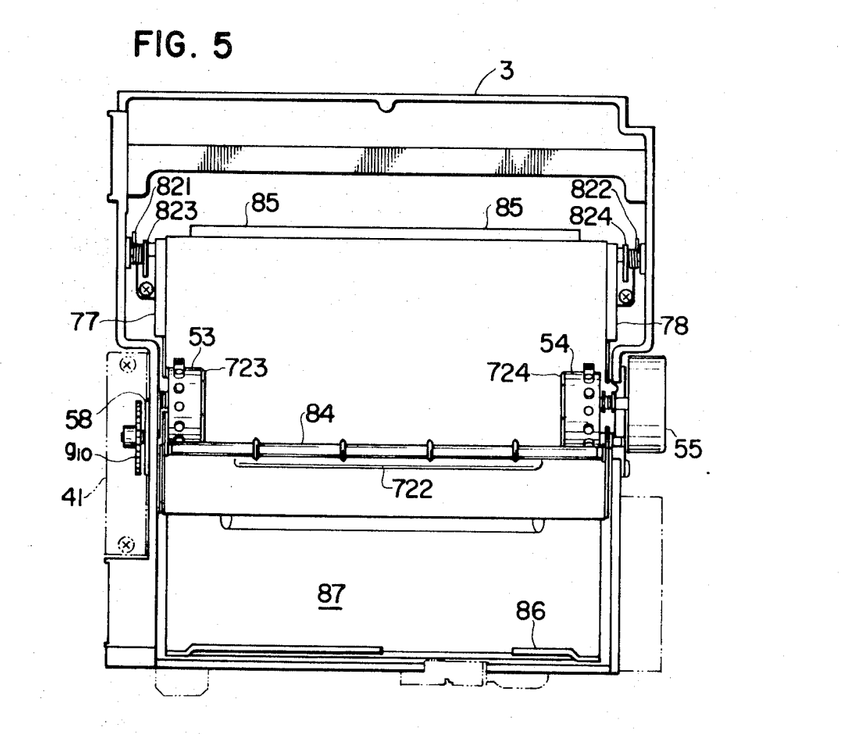
FIG. 5 is a front view of the chart drive mechanism.
Figure 6:
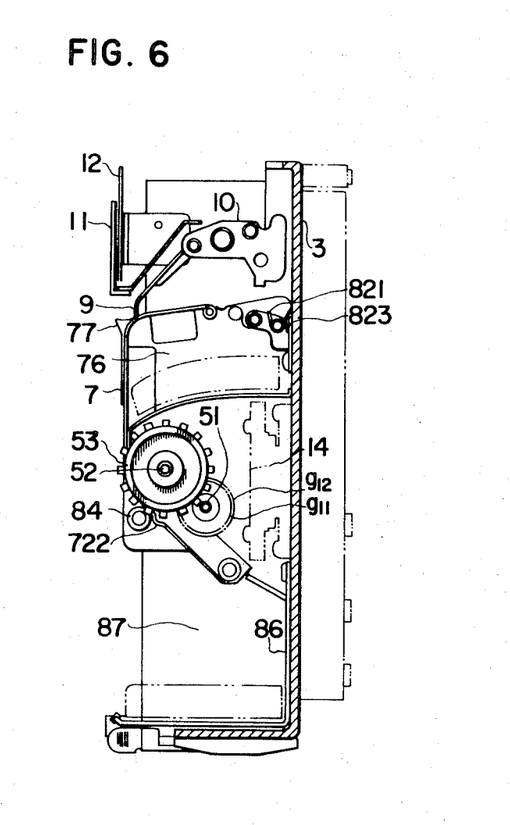
FIG. 6 is a side sectional view of the mechanism of FIG. 5.

FIG. 5 is a front view of the chart drive mechanism C, and FIG. 6 is a right-side view of the mechanism. Referring to these figures (as well as to FIGS. 1 and 2), there is shown a chart holder secured to the inner housing 3 through a shaft 71. The holder consists of a guide plate 72 with a substantially C-shaped section, left and right side plates 73, 74, and an intermediate plate 75, all of thin sheets. The space defined between the upper portion 721 of the guide plate 72 and the intermediate plate 75 constitutes a supply compartment 76 for storing the unused chart 70. To the outer sides of the side plates 73, 74 are attached, respectively, catches 77, 78, which are made of a synthetic resin and partly roughened on the surface. A rib 722 is formed on the surface of the guide plates 72. The front part of the guide plate 72 is formed with cutaway portions 723, 724 at the left and right corners, to receive the sprockets 53, 54, respectively.

Of four rollers 81 to 84 provided, the second roller 82 (FIG. 7) is secured to the inner housing 3, but the other three rollers 81, 83 and 84 are secured to holder 7 (FIG. 2). The second roller 82 secured to the inner housing 3 is supported by rocking arms 823, 824 which are equipped with springs 821, 822, so that the roller 82 can rock within a predetermined range. The springs 821, 822 apply a downward force to the second roller 82 as indicated by an arrow in FIG. 7. The fourth roller 84 carries bead-like rings arranged at suitable intervals thereon, so that the friction between the roller 84 and the chart 70 that is fed along a stationary base or guide plate 72 can be reduced. A pressure plate 85 is formed of a leaf spring, with its free end arcuately bent to act in substantially the same manner as the second roller 82.

An L-shaped support plate 86 (FIG. 7) defines a space constituting a receiving compartment 87 wherein the recorded portion of the chart 70 is folded and stored. Also shown are a recording pen 9, a movable part of the instrument which carries the recording pen, a pointer 11, (FIG. 2), a scale 12, a balance unit 13 (FIG. 1), a pulley 14 for driving the movable part 10 with control thread 15, a wire bundle 16, and a terminal box 17.

LOADING OF CHART INTO THE MECHANISM

The operator grasps the catches 77, 78 attached to both sides of the holder 7 of the chart drive mechanism C and pulls then frontward. The holder is turned about the shaft 71 (FIG. 2) and is drawn out in front of the instrument to the position as indicated by broken lines in FIG. 7. Unrecorded chart 70 in folded state is inserted, with its initial fold directed frontward, into the compartment 76 of the holder 7 thus drawn out. A suitable length of the initially folded portion of the chart 70 is pulled up, folded back around the first roller 81, and, past the third roller 83, it is let fall along the front side of the guide plate 72. Then, the holder 7 is turned clockwise (as viewed in FIGS. 6 and 7) and again set into the inner housing 3. At this time, the second roller 82 fits in between the first roller 81 and the third roller 83, thereby locking the holder 7 to the inner housing 3 and giving a certain tension to the portion of the chart 70 spread over the guide plate 72, so as to ensure accurate and smooth recording by the recording pen as will be described later.

The pressure plate 85 drops with its front end into the space between the third roller 83 and the end of the guide plate 72, and by the elastic displacement of its arcuate free end, it cooperates with the second roller 82 to give tension to the chart 70. Next, the leading end of the chart 70 hanging along the front side of the holder 7 is threaded between the guide plate 72 and the roller 84, with the perforations formed along the edges of the chart in engagement with the sprockets 53, 54, until the leading end reaches the compartment 87. The chart 70 has now been loaded into the instrument.

FEEDING OF THE CHART

The synchronous motor 40 is started, and the rotational power from the motor is transmitted from the output gear $g_1$ to the gearing A via the gear $g_2$. Inside the gearing, the rotational force is transmitted from the gear $g_2$ to the output gear $g_9$ in mesh with the gear $g_{10}$ to drive the transmission shaft 51. The rotation of the shaft 51 in turn is further conducted to the sprocket shaft 52 by way of the gears $g_{11}$ and $g_{13}$ (when the frequency of the power source is 50 Hz), and the shaft 52 is thereby rotated.

Figure 7:
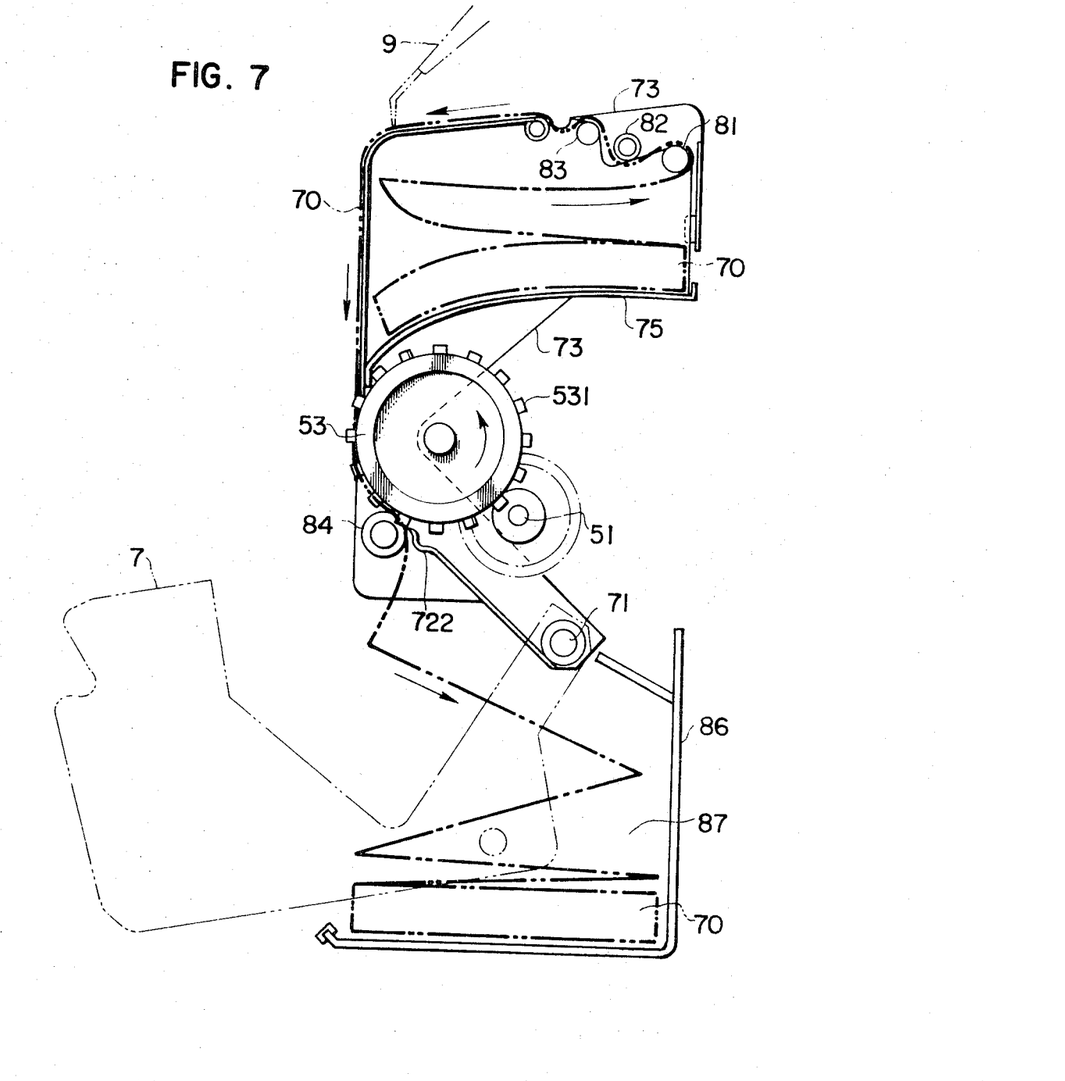
FIG. 7 is a view explanatory of the operation of the chart drive mechanism.

As the sprockets 53, 54 are caused to rotate by the shaft 52, the blank chart 70 in the compartment 76 is pulled out "fold after fold" from the uppermost folded layer upward as indicated by the alternate long and two short dashes lines in FIG. 7, into contact with the first to third rollers 81 to 83 and the pressure plate 85, and advances along the guide plate 7 in the direction indicated by an arrow. At this time, the portion of the chart 70 leaving the compartment 76 is given an arcuate "curl" by the small-diameter first roller 81. This "curl" is automatically corrected by the second roller 82, third roller 83 and the pressure plate 85 which together provide arcuate paths alternating in opposite directions.

The portion of the chart 70 passing over the guide plate 72 is marked with measured values by the recording pen 9, and descends along the front side of the guide plate 72 toward the sprockets 53, 54. While this portion of the chart 70 is in the vertical position in front of the guide plate 72, the record line representing the measured values is observed from the front of the instrument through the transparent window 22 of the door 2.

The chart 70 passes between the guide plate 72 and the fourth roller 84, and is forced out (in the direction of the door 21) by the rib 722 of the roller 84. As a result, the chart 70 is fed so that its "ribbed" fold 70a (when the fold type chart is spread, its folds appear to be alternate ribs and grooves as viewed from one side of the paper) come to the front of the receiving compartment 87 and its "grooved" folds 70b come to the rear of the compartment. They combine with the curling tendency of the chart to fold the recorded chart forcibly and in orderly fashion within the receiving compartment.

We claim:

1. In a chart recorder instrument wherein sprockets of a sprocket mechanism connected to a synchronous motor via gearing are driven by the motor, a blank chart portion stored in folded state is pulled out by said sprockets and spread for recording of measured values thereon, and the recorded chart portion is folded again to be stored; and means define a chart supply compartment and a recorded chart receiving compartment located on opposite sides of said sprockets, the improvement comprising:

an inner frame to which the sprocket mechanism, synchronous motor and gearing are secured;
a movable holder housing the chart supply compartment, said chart supply compartment being disposed vertically above said chart receiving compartment and above said sprockets,
said movable holder having means for guiding said chart upwardly from the chart supply compartment for recording and downwardly along the front of the instrument for display of recorded values and then into engagement with said sprockets for folding and housing said recorded chart in said chart receiving compartment, said chart receiving compartment being accessible from the front of the instrument whereby said chart drive mechanism compactly stores and displays and provides access to said chart, and
means pivotally mounting said movable holder on said inner frame to permit said holder to be shifted out to the front of the instrument for access to said chart supply compartment and for loading, said holder shifting the chart supply compartment to the front of the instrument in a path over said sprockets, and shifting the guide means away from said sprockets to bring the chart out of engagement with the sprockets.

2. A chart drive mechanism as defined in claim 1 comprising a roller adjacent said sprockets and extending across the width of the chart in the vicinity of the inlet of the receiving compartment in which the recorded chart is accommodated, the part of the holder facing said roller being formed within a raised deflecting rib protruding toward the front of the instrument, said roller cooperating with said rib to cause said rib to force the chart in the vicinity of the inlet of the receiving compartment frontwardly of the instrument and thereby forcefully fold the recorded chart within said compartment.

3. A chart recorded instrument as claimed in claim 1 wherein the synchronous motor and at least a portion of the gearing are contained in a separable propulsion unit mountable in position on the inner frame of the instrument and having a disengageable coupling to said sprockets, said unit having self-contained speed reduction gears with selected reduction ratios or shifting positions combined with said synchronous motor in a unitary construction interchangeable in the mechanism with other propulsion units having different gearing arrangements.

4. A chart drive mechanism as in claim 6 wherein the propulsion unit has a case formed with an opening in the side plate on the side of the gear case, said opening being arranged to receive a locating disc provided on the inner frame, and wherein the propulsion unit has an output gear coupling to an input gear connected to said sprockets, said case opening and locating disc positioning said input and output gears for proper meshing.

5. A chart recorder instrument as claimed in claim 1 wherein the sprocket mechanism includes a transmission shaft connected to the gearing and mounted on the inner frame;
 a sprocket shaft parallel to the transmission shaft and mounted on the inner frame;
 two pairs of gears connecting said shafts together, the two pairs of connecting gears providing two speeds for the sprocket shaft related to one another in the ratio of 6:5;
 a sleeve mounting the two gears for the sprocket shaft, said sleeve being slidable over said sprocket shaft so that the intermeshing gears of the pairs can be shifted by sliding the sleeve, whereby to compensate for a change in the chart drive rate due to the difference between 60 Hz and 50 Hz frequencies of power sources.

6. In a chart drive mechanism for recorders wherein sprockets of a sprocket mechanism connected to a synchronous motor via gearing are driven by the motor, and a blank chart portion stored in folded state is pulled out and spread for recording of measured values thereon, and the recorded chart portion is folded again to be stored; the improvement comprising:
 means defining a chart supply compartment and a recorded chart receiving compartment located on opposite sides of said sprockets, said chart supply compartment being disposed vertically above said chart receiving compartment, and means for guiding said chart upwardly from the chart supply compartment for recording and downwardly along the front of the instrument for display of recorded values, said sprockets folding and housing said recorded chart in said chart receiving compartment, said chart receiving compartment being accessible from the front of the instrument whereby said chart drive mechanism compactly stores and displays and provides access to said chart;
 said compartment means comprising a movable holder housing the chart supply compartment; an inner frame; and means pivotally mounting said holder on said frame to permit said holder to be shifted out to the front of the instrument for access to said chart supply compartment and for loading, said sprockets and synchronous motor being fixed with respect to said frame and said holder shifting to the front of the instrument away from said sprockets;
 rollers mounted on the holder adjacent the exit of the blank-chart supply compartment so that the leading end portion of the chart can be threaded along the rollers; and
 a rocking roller mounted on the instrument adjacent and between the other said rollers to tension the chart portion pulled out of the compartment and spread out, said rocking roller being secured to the instrument and being arranged to engage a portion of said holder to secure the holder in operating position.

* * * * *

UNITED STATES PATENT OFFICE
CERTIFICATE OF CORRECTION

Patent No. 3,798,659　　　　　　　　　Dated March 19, 1974

Inventor(s) TAKEFUMI HASEBE, ARATA TAKIZAWA and SETSUO SATO

It is certified that error appears in the above-identified patent and that said Letters Patent are hereby corrected as shown below:

First Page:

Inventors:　　　　　　Change "Setsuc Sato" to --Setsuo Sato--

Assignee:　　　　　　Change "Yokohama" to --Yokogawa--

Signed and sealed this 30th day of July 1974.

(SEAL)
Attest:

McCOY M. GIBSON, JR.　　　　　　C. MARSHALL DANN
Attesting Officer　　　　　　　　Commissioner of Patents